(12) United States Patent
Liu et al.

(10) Patent No.: US 12,042,997 B2
(45) Date of Patent: Jul. 23, 2024

(54) AUTOMATIC LEVELING DEVICE OF 3D PRINTER AND 3D PRINTER

(71) Applicant: Shenzhen Creality 3D Technology Co., Ltd., Shenzhen (CN)

(72) Inventors: Hui-Lin Liu, Shenzhen (CN); Jing-Ke Tang, Shenzhen (CN); Chun Chen, Shenzhen (CN); Dan-Jun Ao, Shenzhen (CN); Peng-Jian Li, Shenzhen (CN); Bin Qiao, Shenzhen (CN); Pin Chen, Shenzhen (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 181 days.

(21) Appl. No.: 17/608,927

(22) PCT Filed: Feb. 8, 2021

(86) PCT No.: PCT/CN2021/076013
§ 371 (c)(1),
(2) Date: Nov. 4, 2021

(87) PCT Pub. No.: WO2022/134288
PCT Pub. Date: Jun. 30, 2022

(65) Prior Publication Data
US 2022/0396033 A1   Dec. 15, 2022

(30) Foreign Application Priority Data
Dec. 21, 2020   (CN) .......................... 202011522210.9

(51) Int. Cl.
*B29C 64/00*    (2017.01)
*B29C 64/245*   (2017.01)
(Continued)

(52) U.S. Cl.
CPC .......... *B29C 64/393* (2017.08); *B29C 64/245* (2017.08); *B33Y 30/00* (2014.12); *B33Y 50/02* (2014.12); *G01C 9/06* (2013.01)

(58) Field of Classification Search
CPC ...................................................... G01C 9/06
See application file for complete search history.

(56) References Cited

U.S. PATENT DOCUMENTS

| 4,120,093 | A |   | 10/1978 | Spies |   |
|---|---|---|---|---|---|
| 4,301,338 | A | * | 11/1981 | McMurtry | ............. G01B 7/012 200/61.42 |

(Continued)

FOREIGN PATENT DOCUMENTS

| CN | 107116787 | A | * | 9/2017 | ............. B33Y 30/00 |
|---|---|---|---|---|---|
| CN | 210651887 | U |   | 6/2020 |   |
| CN | 111823574 | A |   | 10/2020 |   |

OTHER PUBLICATIONS

Xu et al., A Three-dimensional Printing Platform Leveling System and Distance Measuring Device and Levelling Method Thereof, 2017, Espacenet, machine translation. (Year: 2017).*

*Primary Examiner* — Nicholas R Krasnow
(74) *Attorney, Agent, or Firm* — ScienBiziP, P.C.

(57) ABSTRACT

An automatic leveling device of a 3D printer, and a 3D printer is provided. The automatic leveling device includes a photoelectric switch, an electromagnetic assembly and a probe assembly. The photoelectric switch is arranged in a housing and defines a photosensitive groove. The electromagnetic assembly is arranged in the housing and defines a sliding hole. The probe assembly is slidably engaged in the sliding hole, and an end of the probe assembly is engaged in the photosensitive groove. The electromagnetic assembly is capable of driving the probe assembly to make the end of the probe assembly move out of the photosensitive groove. The automatic leveling device has the advantages of simple structure, low manufacturing difficulty, low production cost, (Continued)

simple and stable leveling mode, high detection repetition accuracy and no complex circuit and software cooperation.

17 Claims, 4 Drawing Sheets

(51) Int. Cl.
| | |
|---|---|
| *B29C 64/393* | (2017.01) |
| *B33Y 30/00* | (2015.01) |
| *B33Y 50/02* | (2015.01) |
| *G01C 9/06* | (2006.01) |

(56) References Cited

U.S. PATENT DOCUMENTS

| | | | | |
|---|---|---|---|---|
| 4,462,162 A | * | 7/1984 | McMurtry | G01B 7/012 33/561 |
| 4,716,657 A | * | 1/1988 | Collingwood | G01B 7/002 33/561 |
| 5,279,042 A | * | 1/1994 | Gonzalez | G01B 7/002 455/67.14 |
| 5,345,689 A | * | 9/1994 | McMurtry | G01B 11/007 33/559 |
| 5,471,302 A | * | 11/1995 | Khopov | G01B 9/02028 356/511 |
| 6,430,833 B1 | * | 8/2002 | Butter | G01B 5/012 33/561 |
| 2005/0126027 A1 | * | 6/2005 | Hajdukiewicz | G01B 5/012 33/558 |
| 2005/0139060 A1 | * | 6/2005 | Muramatsu | G10H 1/344 84/719 |
| 2009/0025244 A1 | * | 1/2009 | Jonas | G01B 21/047 374/E1.001 |
| 2013/0304250 A1 | * | 11/2013 | McMurtry | G01B 5/012 700/195 |
| 2019/0061265 A1 | * | 2/2019 | Ho | B33Y 50/02 |
| 2020/0337630 A1 | * | 10/2020 | Earthman | G01N 3/317 |

* cited by examiner

AUTOMATIC LEVELING DEVICE OF 3D PRINTER AND 3D PRINTER

FIELD

The disclosure relates to the technical field of 3D printing equipment, in particular to an automatic leveling device of a 3D printer and a 3D printer.

BACKGROUND 3D printing technology is a rapid prototyping technology that uses special materials, of wax, powdered metals, or plastics for examples, and digital model files are used to produce three-dimensional objects by printing layers of materials. Fused deposition rapid prototyping technology is one of the main 3D printing technologies. The fused deposition rapid prototyping technology extrudes the hot-melt filament from a nozzle after heating and melting, and deposits the filament on the printing platform or the previous layer of solidified material. When the temperature is low enough, the filament solidifies and forms an object. For the 3D printing process of fused deposition rapid prototyping technology characterized by layer-by-layer deposition, a levelness of the printing platform relative to the print nozzle determines the success or failure of the first layer of the object on the printing platform, and thus determines the success or failure and precision of the entire project. The levelness of the printing platform relative to the print nozzle can be adjusted by manual adjusting screws, which is cumbersome and not sufficiently accurate.

The levelness of the printing platform relative to the print nozzle can be also adjusted by probe, steering gear, and inductive sensor. The probe for adjusting levelness is mainly composed of electromagnetic coils, plungers, and sensors, and levelness is detected by extending and retracting the probe. However, the probe device has high requirements for assembly, production, and manufacturing, and has poor anti-interference immunity and high cost. The steering gear for adjusting levelness is to install a micro switch on a steering gear, put the micro switch down before adjusting levelness, and put it away after adjusting levelness, but an extra steering gear is necessary for the printer nozzle, which complicates the printer nozzle assembly, and the micro switch is required to be put down and be put away before and after adjusting levelness. The steering gear for adjusting levelness is relatively cumbersome. The inductance sensor for adjusting levelness is to use an inductance proximity switch to adjust levelness, but the inductance device has a large volume, takes up the installation space of the printer nozzle, and can only work on platform printing of metallic materials, its applicability is low.

SUMMARY

The first objective of the present disclosure is to provide an automatic leveling device for a 3D printer, which has a small volume, is convenient to install, simple to use, and has a low manufacturing cost.

The second objective of the present disclosure is to provide a 3D printer, which can achieve fast and accurate leveling, thereby ensuring the printing accuracy of the 3D printer.

In order to achieve the above technical effects, the technical solution of the present disclosure is as follows:

The disclosure discloses an automatic leveling device for a 3D printer, comprising: a photoelectric switch defining a photosensitive groove; an electromagnetic component defining a sliding hole; a probe assembly slidably engaged in the sliding hole, and one end of the probe assembly engaged in the photosensitive groove; wherein the electromagnetic assembly can drive the probe assembly to move, so that the end of the probe assembly engaged in the photosensitive groove is separated from the photosensitive groove. In the actual leveling process, the electromagnetic assembly is used to drive the probe assembly to move up and down, and the upper end of the probe assembly is inserted into or removed from the photosensitive groove to control the on and off states of the photoelectric signal of the photoelectric switch, so as to obtain a signal indicating contact by the probe assembly with the platform. This leveling method is simple and stable, has high repeatability, does not require complex circuits and software cooperation, and the entire automatic leveling device has a simple structure, low manufacturing difficulty, and low production cost.

In some embodiments, the probe assembly includes: a connecting post, one end of the connecting post being engaged in the photosensitive groove, the other end of connecting post engaged in the sliding hole. A probe head, where one end of the probe head is connected to the connecting post, and the other end the probe head extends out of the sliding hole; an elastic piece sleeved on the probe head, one end of the elastic piece abutting the connecting post, and the other end abutting the inner end surface of the sliding hole. The probe assembly is split into the connecting post and the probe head, which is very convenient during the installation process, an improves the assembly efficiency of the automatic leveling device. The additional elastic piece creates an automatic rebound function of the connecting post after the leveling is completed, which simplifies the control logic of the automatic leveling device.

In some specific embodiments, the probe head includes: a probe portion having a protrusion extending in circumferentially, the diameter of the protrusion is greater than the diameter of the sliding hole; a connecting portion, one end of connecting portion is connected to the probe part, the other end of connecting portion is connected with the connecting post, and the elastic piece is sleeved on the connecting portion. Thus, the probe part cannot be completely retracted into the sliding hole during the retracting process, thereby ensuring the working reliability of the probe head.

In some embodiments, the probe assembly includes a permanently magnetic probe, which is slidably disposed in the sliding hole, and when the electromagnetic assembly is energized in a forward direction, the permanent magnet probe slides away from the photoelectric switch, when the electromagnetic assembly is energized in the reverse direction, the permanent magnet probe slides toward the photoelectric switch. The structure of the permanent magnet probe is relatively simple, which makes the structure of the entire automatic leveling device simpler, further reduces the difficulty of manufacturing and assembly of the automatic leveling device, and reduces the production cost of the automatic leveling device.

In some embodiments, the electromagnetic assembly includes: a mounting member having a mounting slot extending circumferentially; a coil that is matched and mounted in the mounting slot; and an electromagnetic housing sleeved on the mounting member to close the mounting slot. The electromagnetic assembly is formed into a cylindrical electromagnet structure. On the one hand, it can simplify the structure of the electromagnetic assembly and reduce the volume of the electromagnetic assembly. On the other hand, it can increase the magnetic field strength when the electromagnetic assembly is energized, thereby ensuring that the electromagnetic assembly can drive the probe assembly to move in a stable fashion.

In some specific embodiments, an annular convex plate protrudes from a first end of the electromagnetic housing, the annular convex plate is spaced from an inner peripheral surface of the electromagnetic housing to define a positioning groove, and one end of the mounting member is engaged in the positioning groove. Connection stability and connection sealing performance of the mounting portion and the electromagnetic housing are thus ensured, and the coil is in a relatively sealed space, avoiding contamination of the coil by external dirt, and ensuring that the coil can work stably and reliably.

In some embodiments, the automatic leveling device of the 3D printer further includes a housing connected to the nozzle assembly of the 3D printer, the photoelectric switch and the electromagnetic assembly are both provided in the housing, and the housing includes a front housing and a rear housing. One of the front housing and the rear housing is provided with engaging protrusions, and the other is provided with clamping holes matching the engaging protrusions. The structure of the front housing and the rear housing is simplified, and production of the front housing and the rear housing, and the installation and disassembly of the front housing and the rear housing, are facilitated, thereby making assembly and maintenance of the entire automatic leveling device easier.

In some embodiments, the automatic leveling device of the 3D printer further includes a circuit board, the photoelectric switch is connected to the circuit board, the circuit board is provided with wiring jacks, and the housing is provided with outlet hole corresponding to wiring jacks. A separate circuit board is arranged inside the automatic leveling device, which facilitates the control of the light sensor switch and the control of the electromagnetic assembly, this simplifies the wiring of the 3D printer, and improves the working reliability of the automatic leveling device.

In some specific embodiments, a positioning post is provided on the inner side wall of the housing, and a positioning hole that matches with the positioning post is provided on the circuit board. The installation stability of the circuit board is ensured, and the stability of the photoelectric switch is improved, thereby ensuring the working reliability of the automatic leveling device.

The present disclosure also discloses a 3D printer, including: a nozzle assembly; the automatic leveling device of the 3D printer described above, and the automatic leveling device of the 3D printer connected to the nozzle assembly. The 3D printer uses the automatic leveling device described above to detect points at different positions of the printing platform, and to obtain data as to the height of multiple points on the printing platform, and then the software can be used to calculate the tilt angle of the plane composed of these points (that is, the printing platform) relative to the print head. An angle of tilt can be compensated from the software to ensure that the print head is parallel to the printing platform and to achieve the purpose of adjusting the printing platform, thereby ensuring the printing accuracy of the 3D printer.

The automatic leveling device of the 3D printer and the 3D printer have beneficial effects: in the actual leveling process, the electromagnetic assembly is used to drive the probe assembly to move up and down, and the upper end of the probe assembly is inserted into or separated from the photosensitive groove to control the photoelectric switch turn on or turn off of the photoelectric signal and obtain the signal of the probe assembly in making contact with the platform. After multiple leveling operations, the height data of multiple points on the printing platform can be obtained, and the software can be used to calculate any tilt angle of the plane composed of these points (that is, the plane of the printing platform) relative to the print head. The tilt angle is compensated by the software to effectively align the print head parallel to the print platform in achieving the purpose of adjusting levelness of the print platform. This leveling method is simple and stable, and the repeatability is accurate. It does not require complex circuits and software cooperation, and the structure of the entire automatic leveling device is simple, the manufacturing difficulty is low, and the production cost is low.

The additional aspects and advantages of the present disclosure will be partly given and partly obvious in the following description.

| LABEL OF COMPONENTS | |
|---|---|
| Housing | 1 |
| Front housing | 11 |
| Clamping hole | 111 |
| Outlet hole | 112 |
| Rear housing | 12 |
| Engaging protrusion | 121 |
| Photoelectric switch | 2 |
| Photosensitive groove | 21 |
| Electromagnetic assembly | 3 |
| Mounting member | 31 |
| Mounting slot | 311 |
| Coil | 32 |
| Electromagnetic housing | 33 |
| Annular convex plate | 331 |
| Positioning groove | 332 |
| Probe assembly | 4 |
| Connecting post | 41 |
| Probe head | 42 |
| Probe portion | 421 |
| protrusion | 4211 |
| Connection portion | 422 |
| Elastic piece | 43 |
| Circuit board | 5 |
| Positioning hole | 51 |
| Wiring jack | 52 |

DETAILED DESCRIPTION

In order to make the technical problems solved by the present disclosure, the technical solutions adopted and the technical effects achieved more clear, the technical solutions of the present disclosure will be further described below with reference to the drawings and specific implementations.

In the description of the present disclosure, it should be understood that the terms "upper", "lower", "inner", "outer", "axial", "radial", "circumferential", etc. indicate the orientation or positional relationship based on the orientation or positional relationship shown in the drawings, it is only for the convenience of describing the present disclosure and simplifying the description, rather than indicating or implying that the device or element referred to must have a specific orientation, be constructed and operated in a specific orientation, and therefore it cannot limit the present disclosure.

In the description of the present disclosure, it should be noted that the terms "installed", "connecting", and "connected" should be interpreted broadly unless otherwise clearly specified and limited. For example, they can be fixed or detachable connected or integrally connected; they can be directly connected, or indirectly connected through intermediate components, and they can be the internal connections between two components. For those of ordinary skill in the art, the specific meanings of the above-mentioned terms in the present disclosure can be understood in specific situations.

First Embodiment

Reference to FIGS. 1-4, an automatic leveling device for a 3D printer according to an embodiment of the present disclosure is described following.

Referring to FIGS. 1-4, an automatic leveling device is disclosed. The automatic leveling device is employed in a 3D printer. The automatic leveling device includes a housing 1, a photoelectric switch 2, an electromagnetic assembly 3, and a probe assembly 4. The housing 1 is connected to a nozzle assembly of the 3D printer. The photoelectric switch 2 is arranged in the housing 1. The photoelectric switch 2 defines a photosensitive groove 21. The electromagnetic assembly 3 is arranged in the housing 1. The electromagnetic assembly 3 defines a sliding hole. The probe assembly 4 is slidably arranged in the sliding hole. One end of the probe assembly 4 is arranged in the photosensitive groove 21. The electromagnetic assembly 3 moves the probe assembly 4, such that the end of the probe assembly 4 arranged in the photosensitive groove 21 moves away from the photosensitive groove 21. During leveling process, after the current is applied to the electromagnetic assembly 3, the probe assembly 4 moves downward under the attraction of magnetic force. During the downward movement, an upper end of the probe assembly 4 is pulled out of the photosensitive groove 21 of the photoelectric switch 2, and the photoelectric switch 2 is turned on to control the nozzle assembly of the entire 3D printer to move downward. The nozzle assembly drives the automatic leveling device to move downward. When the lower end of the probe assembly 4 touches a printing platform, the lower end of the probe assembly 4 is pushed upward and moves upward for a preset distance, so that the upper end of the probe assembly 4 enters into the photosensitive groove 21 of the photoelectric switch 2 and blocks light signal. At the time, a circuit board 5 receives an off signal of the photoelectric switch 2, the nozzle assembly stops moving down, and transmits data as to current height of the nozzle assembly to a control board of the 3D printer, thereby completing a leveling operation at one point of several points. The automatic leveling device drives the probe assembly 4 up and down through the electromagnetic assembly 3, and control the on and off states of the photoelectric signal of the photoelectric switch 2 as the upper end of the probe assembly 4 moves into or moves away from the photosensitive groove 21, thereby obtaining a signal of the probe assembly 4 making contact with the printing platform. The working process of the automatic leveling device is simple and stable, with high repeatability, and does not require complex circuits and software cooperation, the structure of the automatic leveling device is simple, the manufacturing difficulty is low, and the production cost is low.

In an embodiment, the housing 1 includes a front housing 11 and a rear housing 12. The front housing 11 defines four clamping holes 111 on a front wall of the front housing 11. The front housing 11 defines an outlet hole 112 on a top wall of the front housing 11. Four spaced positioning posts protrude from an inner side of the front housing 11. The four clamping holes 111 are divided into two groups. Two clamping holes 111 in each group are spaced in a vertical direction. The two groups of clamping holes 111 are respectively located on the left and right of the front wall of the front housing 11. Four engaging protrusions 121 protrude from the rear housing 12. Each of the engaging protrusions 121 can engage with a respective clamping hole 111. The engaging protrusion 121 is detachably connected to the clamping hole 111, on one hand it has a simple structure and is convenient for manufacturing the front housing 11 and the rear housing 12, and on the other hand, it facilitates the installation and disassembly of the front housing 11 and the rear housing 12, and thus it facilitates the assembly and maintenance of the automatic leveling device. The circuit board 5 defines four positioning holes 51 and wiring jacks 52. Each positioning post is engaged with one positioning hole 51, and the wiring jacks 52 communicate with the outlet hole 112.

Figure 1:
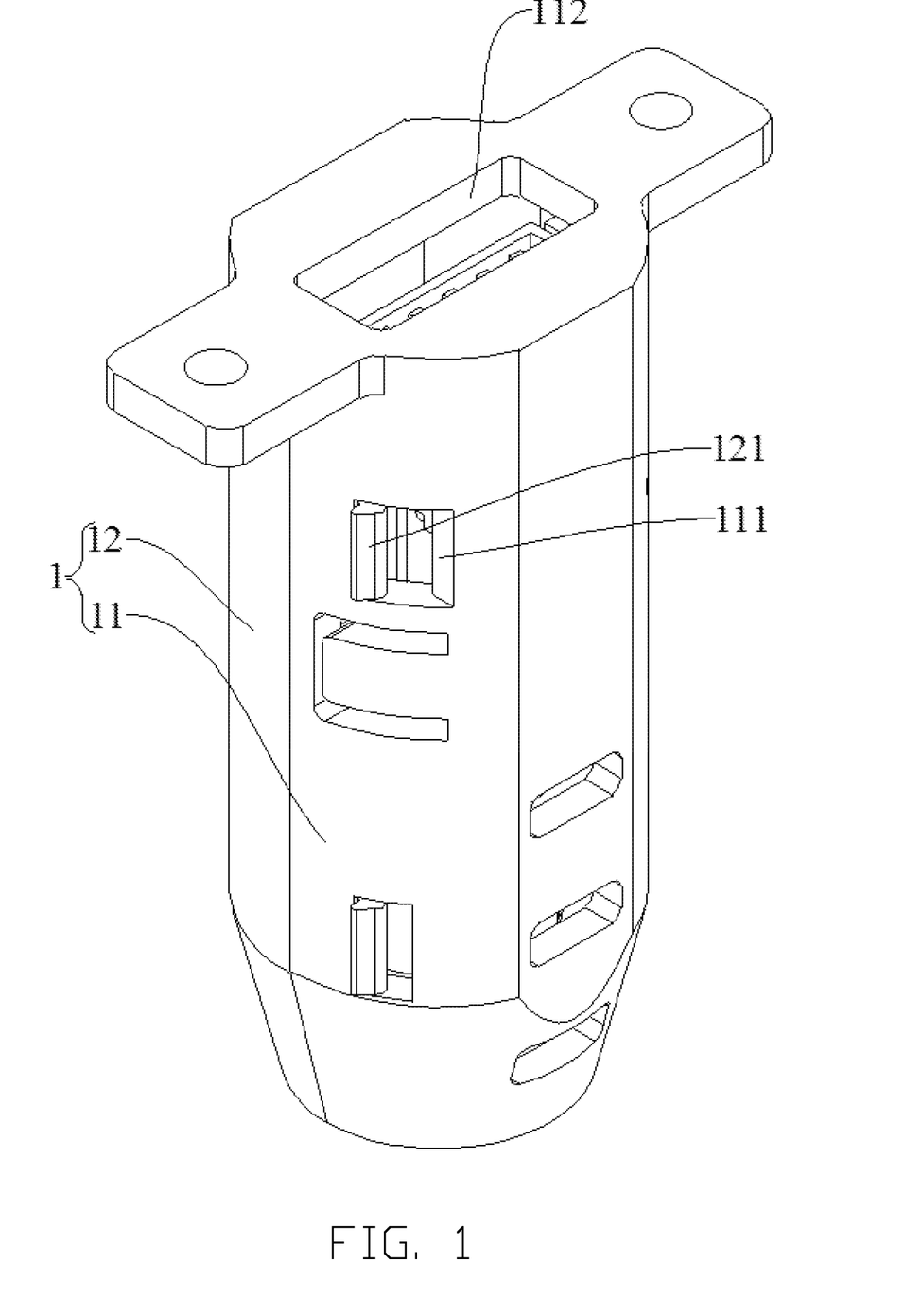
FIG. 1 is an isometric view of an automatic leveling device of a 3D printer according to a first embodiment of the present disclosure.
Figure 2:
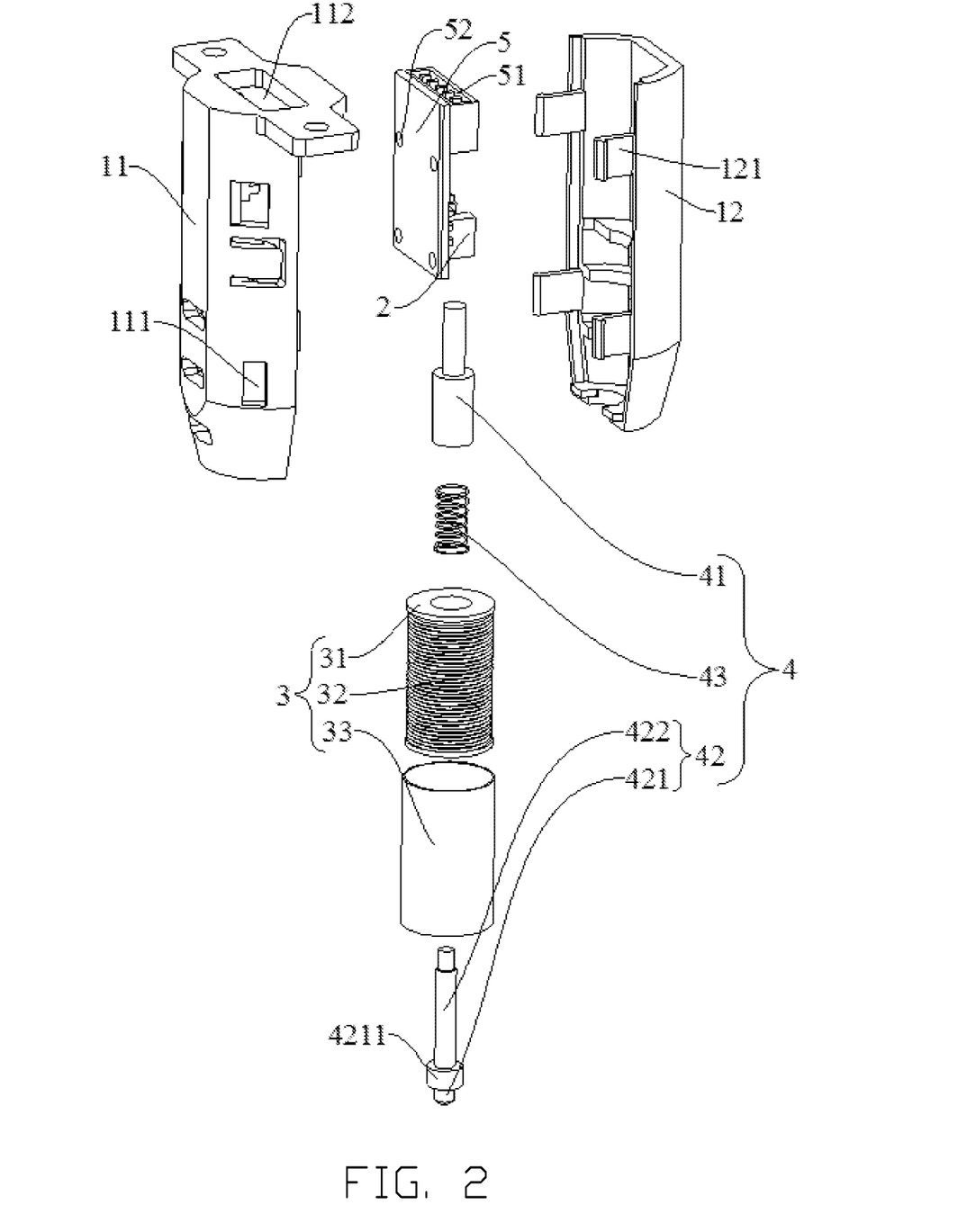
FIG. 2 is an exploded view of the automatic leveling device of the 3D printer according to the first embodiment of the present disclosure.

If the circuit board 5 is not installed in the automatic leveling device, the photoelectric switch 2 and the electromagnetic component 3 would all be connected to the control board of the 3D printer through wires, which would not only make the wiring of the 3D printer more complicated, but also reduce working reliability of the automatic leveling device. However, according to this embodiment, the circuit board 5 is separately provided in the automatic leveling device, which facilitates the control of light sensor switches and the control of the electromagnetic component 3. During the installation process, only one data cable is needed to connect the circuit board 5 with the 3D printer, which not only simplifies the wiring of the 3D printer, but also improves the working reliability of the automatic leveling device.

Figure 3:
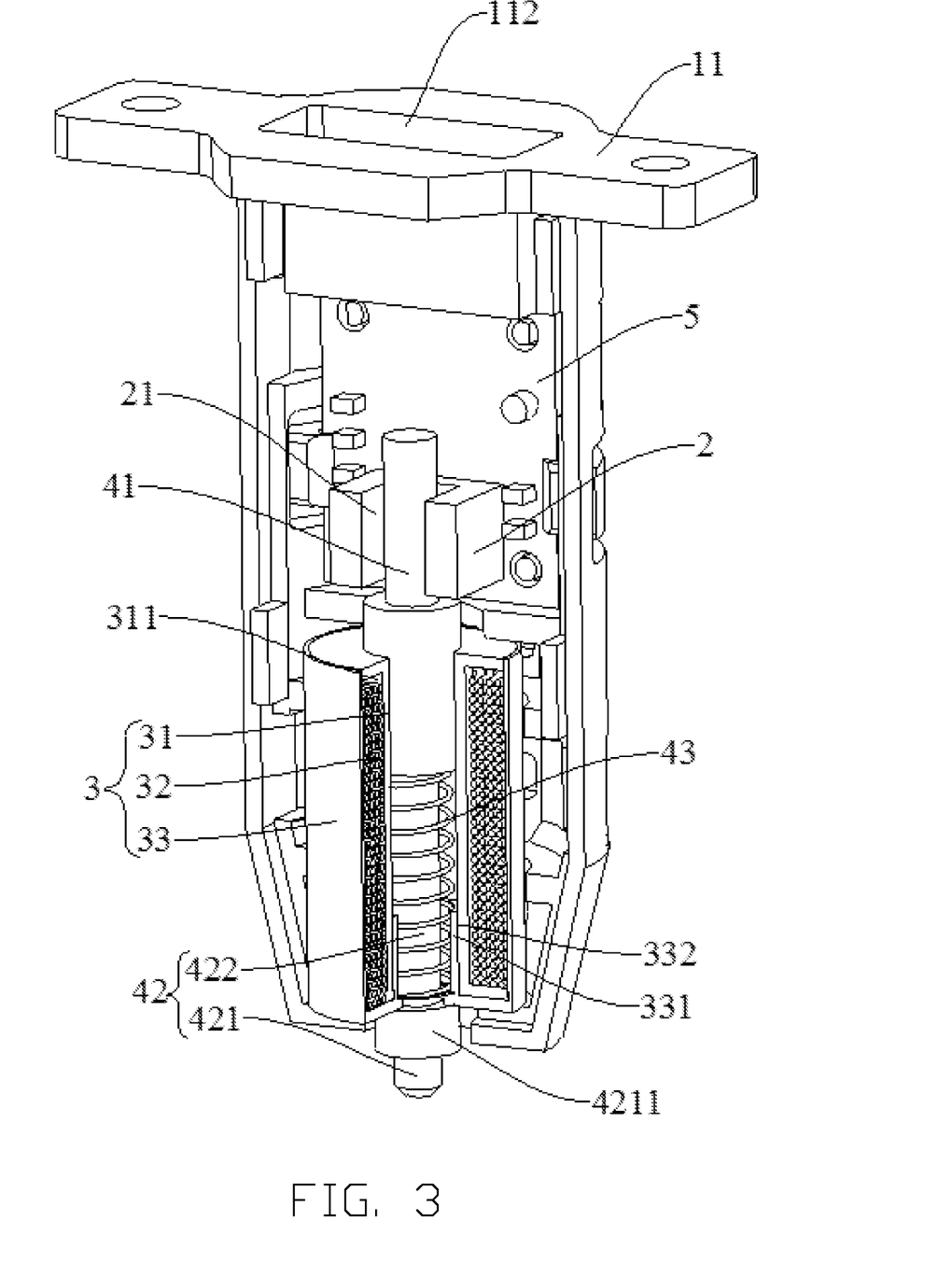
FIG. 3 is a schematic view of a probe assembly of the automatic leveling device of the 3D printer in a retracted state according to the first embodiment of the present disclosure.
Figure 4:
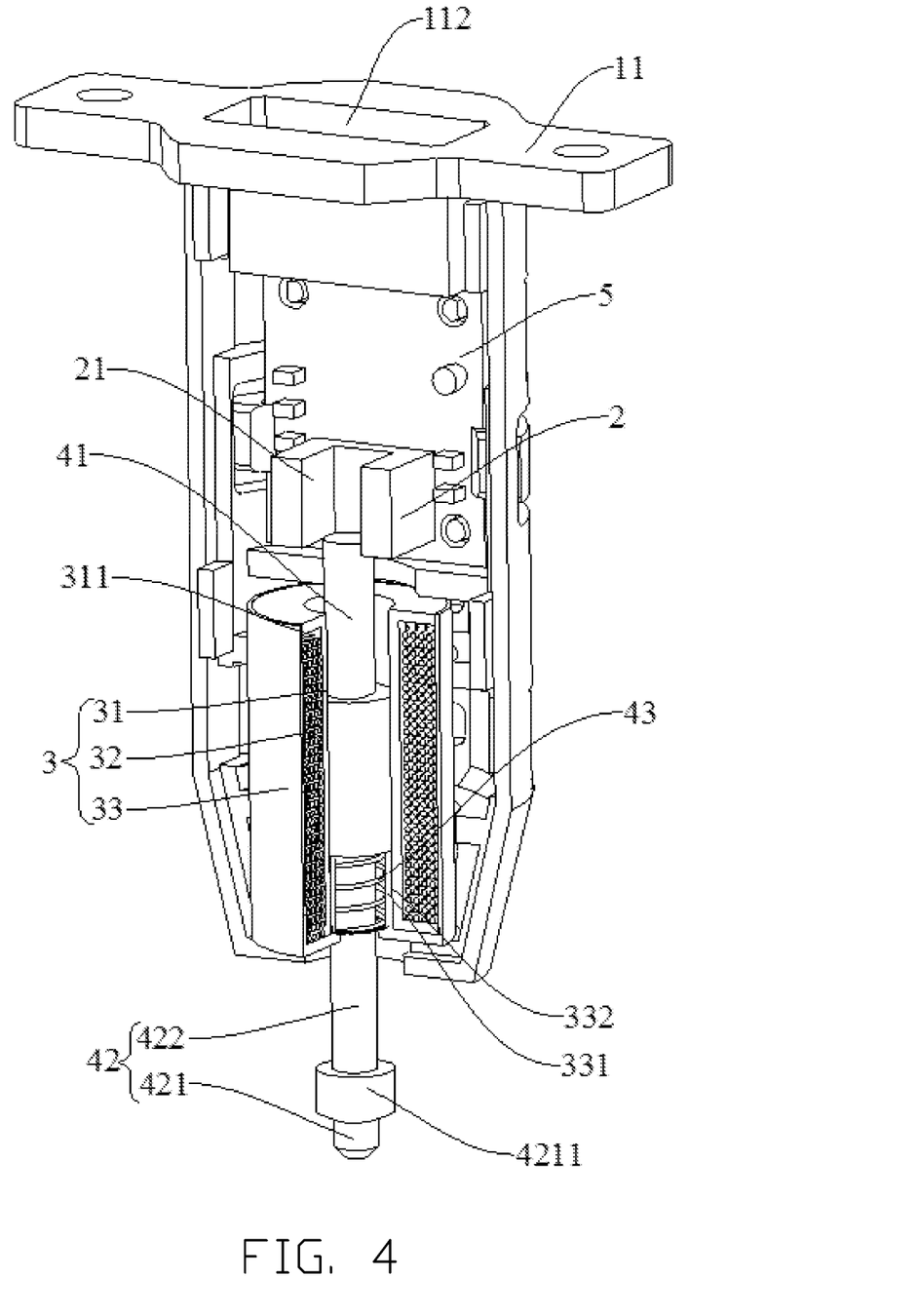
FIG. 4 is a schematic view of a probe assembly of the automatic leveling device of the 3D printer in an extended state according to the first embodiment of the present disclosure.

Specifically, the electromagnetic assembly 3 includes a mounting member 31, a coil 32, and an electromagnetic housing 33. The mounting member 31 defines a mounting slot 311 extending circumferentially. The coil 32 is engaged in the mounting slot 311, and the electromagnetic housing 33 is sleeved on the mounting member 31 to close the mounting slot 311. An annular convex plate 331 protrudes from one end of the electromagnetic housing 33. The annular convex plate 331 is spaced from the inner peripheral surface of the electromagnetic housing 33 to define a positioning groove 332. One end of the mounting member 31 is engaged in the positioning groove 332. The electromagnetic assembly 3 is cylindrical, on the one hand, the simplicity and the volume of the electromagnetic assembly 3 are reduced, on the other hand, the magnetic field strength of the electromagnetic assembly 3 is increased when the electromagnetic assembly 3 is energized, so as to ensure that the electromagnetic assembly 3 can stably drive the probe assembly 4 to move.

The mounting member 31 is inserted into the positioning slot 332 on the electromagnetic housing 33 to ensure the connection stability and connection sealing performance of the mounting member 31 and the electromagnetic housing 33, so as to better ensure that the coil 32 is in a sealed space and protected from external contaminants, thus the coil 32 can work stably and reliably.

In an embodiment, the electromagnetic housing 33 is a metal housing, and the metal housing forms an electromagnetic shielding layer to avoid interference from external electromagnetic signals.

Specifically, the probe assembly 4 includes a connecting post 41, a probe head 42, and an elastic piece 43. One end of the connecting post 41 is engaged in the photosensitive groove 21, the other end of the connecting post 41 is engaged in the sliding hole. One end of the probe head 42 is connected to the connecting post 41 by screws, and the other end of the probe head 42 extends out of the sliding hole. The elastic piece 43 is sleeved on the probe head 42. One end of the elastic piece 43 abuts the connecting post 41, and the other end of the elastic piece 43 abuts the inner surface of the sliding hole. In leveling process, after the housing 1 is installed on the nozzle assembly of the 3D printer, a large current is fed to the coil 32, a magnetic field is generated by the magnetic effect of the current, and the connecting post 41 is attracted by the magnetic force to overcome the thrust of the elastic member 43 and move downward, so that the probe head 42 is extended. After the probe head 42 is fully extended, the energization voltage and current of the coil 32 are reduced. Since the energization voltage and current of the coil 32 are made smaller, the generated magnetic field is weaker, and the force on the probe head 42 is smaller. At this time, small pressure allows more accurate sensing by the probe head 42 of the printing platform. In this way, the leveling accuracy of the automatic leveling device can be improved. During the downward movement of the connecting post 41, the other end of the connecting post 41 moves out of the photosensitive groove 21 of the photoelectric switch 2. The photoelectric switch 2 is turned on to control the nozzle assembly of the entire 3D printer to move downward, and the nozzle assembly drives the automatic leveling device to move downward, so that when the probe head 42 touches the printing platform, the probe head 42 is pushed upward by the printing platform and moves a certain distance. At this time, the connecting post 41 also moves upwards and enters the photosensitive groove 21 of the photoelectric switch 2, and blocks light signal. Then the photoelectric switch 2 provides disconnection signal to the circuit board 5, the print head assembly stops moving downward, and transmits the current height of the print head assembly to the control board of the 3D printer, and then the coil 32 is powered off, the probe head 42 is retracted and restored to original state under the urging of the elastic member 43. Then the leveling is finished at one point, and the leveling at the next point is performed. In the actual leveling process, the leveling operation is required at three points at least.

Further, the probe head 42 includes a probe portion 421 and a connecting portion 422. A protrusion 4211 protrudes from the probe portion 421 circumferentially. The diameter of the protrusion 4211 is larger than the diameter of the sliding hole. One end of the connecting portion 422 is connected to the probe portion 421, the other end of the connecting portion 422 is connected with the connecting post 41, and the elastic piece 43 is sleeved on the connecting portion 422. Because the diameter of the protrusion 4211 is larger than the diameter of the sliding hole, the probe portion 421 is prevented from retracting into the sliding hole, thereby ensuring the working reliability of the probe head 42. In an embodiment, the probe head 42 is a soft magnetic metal piece, which can ensure that the probe head 42 is driven to move stably when the coil 32 is energized, thereby ensuring that the probe head 42 can stably contact the printing platform.

In an embodiment, the probe assembly 4 further includes a permanent magnet probe, which is slidably arranged in the sliding hole. When the electromagnetic assembly 3 is energized in a forward direction, the permanent magnet probe slides in a direction away from the photoelectric switch 2. When the electromagnetic component 3 is energized in a reverse direction, the permanent magnet probe slides toward the photoelectric switch 2. Compared with the probe assembly 4 including the connecting post 41, the probe head 42 and the elastic member 43 described above, a probe assembly 4 consisting only of a permanent magnet probe is simpler, thereby enabling a simpler automatic leveling device, further reducing the difficulty of manufacturing and assembly of the automatic leveling device, and reducing the production cost of the automatic leveling device.

Second Embodiment

The present disclosure also provides a 3D printer. The 3D printer includes a nozzle assembly and the automatic leveling device, and the automatic leveling device is connected to the nozzle assembly. The 3D printer uses an automatic leveling device to detect points at different positions on the printing platform, and obtains height data of a plurality of points along a Z axis. A tilt angle of the plane of these points (i.e. the plane of the printing platform) relative to the nozzle can be calculated by a software. Software can determine and provide compensation for the tilt angle, so that the print head will be parallel to the printing platform, thereby ensuring the printing accuracy of the 3D printer.

In the description of this specification, the description with reference to the terms "some embodiments", "other embodiments", etc. means that the specific features, structures, materials or features described in combination with the embodiment or example are included in at least one embodiment or example of the present disclosure. In this specification, the schematic expression of the above terms does not necessarily refer to the same embodiment or example. Further, the specific features, structures, materials or features described may be combined in a suitable manner in any one or more embodiments or examples.

The above content is only a preferred embodiment of the disclosure. For ordinary technicians in the art, the changes are obtained based on the exemplary embodiment and applying scope according to the idea of the disclosure, the content of the specification should not be understood as a limitation of the disclosure.

What is claimed is:

1. An automatic leveling device of a 3D printer, comprising:
 a photoelectric switch, defining a photosensitive groove;
 an electromagnetic assembly, defining a sliding hole;
 a probe assembly, slidably engaged in the sliding hole, and a first end of the probe assembly is extended out of the sliding hole and is engaged in the photosensitive groove;
 wherein the electromagnetic assembly is capable of driving the probe assembly to make the first end of the probe assembly move out of the photosensitive groove;

the probe assembly comprises:
a connecting post, a first end of the connecting post is engaged in the photosensitive groove, a second end of the connecting post is engaged in the sliding hole;
a probe head, slidably engaged in the sliding hole, a first end of the probe head is connected to the connecting post, a second end of the probe head extends out of the sliding hole, the photoelectric switch is located at a side of the electromagnetic assembly away from the second end of the probe head;
an elastic piece, received in the sliding hole, and the elastic piece is sleeved on the probe head, one end of the elastic piece abuts the connecting post, and the other end of the elastic piece abuts an inner surface of the sliding hole;
the electromagnetic assembly comprises:
a mounting member that defines a mounting slot extending along its circumferential direction, the sliding hole is defined in the mounting member;
a coil that is engaged in the mounting slot;
an electromagnetic housing that is sleeved on the mounting member to close the mounting slot;
when the coil is connected to an electric current, the connecting post is configured to resist a thrust of the elastic member and move downward, and the probe head is extended; and
when the coil is disconnected to currents, the probe head is retracted and restored to original state under the urging of the elastic member.

2. The automatic leveling device of the 3D printer of claim 1, wherein the probe head comprises:
a probe portion where a protrusion is protruded from the probe portion along its circumferential direction, and a diameter of the protrusion is larger than a diameter of the sliding hole;
a connecting portion with a first end of the connecting portion connected with the probe portion, and a second end connected with the connecting post, and the elastic member is sleeved on the connecting portion.

3. The automatic leveling device of the 3D printer of claim 1, wherein the probe assembly comprises a permanent magnet probe, the permanent magnet probe is slidably arranged in the sliding hole, when the electromagnetic assembly is energized in a forward direction, the permanent magnet probe slides away from the photoelectric switch, when the electromagnetic assembly is energized in a reverse direction, the permanent magnet probe slides toward the photoelectric switch.

4. The automatic leveling device of the 3D printer of claim 1, wherein an annular convex plate is protruded from a first end of the electromagnetic housing, the annular convex plate is spaced from an inner peripheral surface of the electromagnetic housing to define a positioning groove, where one end of the mounting member is engaged in the positioning groove.

5. The automatic leveling device of the 3D printer of claim 1, further comprising:
a housing, connected to a nozzle assembly of the 3D printer;
wherein the photoelectric switch and the electromagnetic assembly are both arranged in the housing, and the housing comprises a front housing and a rear housing, one of the front housing and the rear housing is provided with engaging protrusions, and another of the front housing and rear housing is provided with clamping holes engaged with engaging protrusions.

6. The automatic leveling device of the 3D printer of claim 5, wherein the automatic leveling device of the 3D printer further comprises a circuit board, the photoelectric switch is connected to the circuit board, the circuit board defines wiring jacks, the housing defines an outlet hole, the outlet hole communicates with the wiring jacks;
the first end of the connecting post is inserted into or removed from the photosensitive groove to respectively control on and off states of photoelectric signals of the photoelectric switch, the circuit board controls a nozzle assembly based on the photoelectric signals.

7. The automatic leveling device of the 3D printer of claim 6, wherein positioning posts are protruded from an inner side of the front housing, the circuit board defines positioning holes, each positioning post is engaged with one positioning hole.

8. A 3D printer comprising:
a nozzle assembly;
an automatic leveling device connected to the nozzle assembly, the automatic leveling device comprising:
a photoelectric switch, defining a photosensitive groove;
an electromagnetic assembly, defining a sliding hole;
a probe assembly, slidably engaged in the sliding hole, and a first end of the probe assembly is extended out of the sliding hole and is engaged in the photosensitive groove;
wherein the electromagnetic assembly is capable of driving the probe assembly to make the first end of the probe assembly move out of the photosensitive groove;
the probe assembly comprises:
a connecting post, a first end of the connecting post is engaged in the photosensitive groove, a second end of the connecting post is engaged in the sliding hole;
a probe head, slidably engaged in the sliding hole, a first end of the probe head is connected to the connecting post, a second end of the probe head extends out of the sliding hole, the photoelectric switch is located at a side of the electromagnetic assembly away from the second end of the probe head;
an elastic piece, received in the sliding hole, and the elastic piece is sleeved on the probe head, one end of the elastic piece abuts the connecting post, and the other end of the elastic piece abuts an inner surface of the sliding hole.

9. The 3D printer of claim 8, wherein the probe head comprises:
a probe portion where a protrusion is protruded from the probe portion along its circumferential direction, and a diameter of the protrusion is larger than a diameter of the sliding hole;
a connecting portion with a first end of the connecting portion connected with the probe portion, and a second end connected with the connecting post, and the elastic member is sleeved on the connecting portion.

10. The 3D printer of claim 8, wherein the probe assembly comprises a permanent magnet probe, the permanent magnet probe is slidably arranged in the sliding hole, when the electromagnetic assembly is energized in a forward direction, the permanent magnet probe slides away from the photoelectric switch, when the electromagnetic assembly is energized in a reverse direction, the permanent magnet probe slides toward the photoelectric switch.

11. The 3D printer of claim 8, wherein the electromagnetic assembly comprises:
a mounting member that defines a mounting slot extending along its circumferential direction, the sliding hole is defined in the mounting member;

a coil that is engaged in the mounting slot;

an electromagnetic housing that is sleeved on the mounting member to close the mounting slot;

when the coil is connected to an electric current, the connecting post is configured to resist a thrust of the elastic member and move downward, and the probe head is extended; and when the coil is disconnected to currents, the probe head is retracted and restored to original state under the urging of the elastic member.

12. The 3D printer of claim 11, wherein an annular convex plate is protruded from a first end of the electromagnetic housing, the annular convex plate is spaced from an inner peripheral surface of the electromagnetic housing to define a positioning groove, where one end of the mounting member is engaged in the positioning groove.

13. The 3D printer of claim 8, further comprising:

a housing, connected to a nozzle assembly of the 3D printer;

wherein the photoelectric switch and the electromagnetic assembly are both arranged in the housing, and the housing comprises a front housing and a rear housing, one of the front housing and the rear housing is provided with engaging protrusions, and another of the front housing and the rear housing is provided with clamping holes engaged with engaging protrusions.

14. The 3D printer of claim 13, wherein the automatic leveling device of the 3D printer further comprises a circuit board, the photoelectric switch is connected to the circuit board, the circuit board defines wiring jacks, the housing defines an outlet hole, the outlet hole communicates with the wiring jacks;

the first end of the connecting post is inserted into or removed from the photosensitive groove to respectively control on and off states of photoelectric signals of the photoelectric switch, the circuit board controls a nozzle assembly based on the photoelectric signals.

15. The 3D printer of claim 14, wherein positioning posts are protruded from an inner side of the front housing, the circuit board defines positioning holes, each positioning post is engaged with one positioning hole.

16. The automatic leveling device of the 3D printer of claim 4, wherein the mounting member comprises a first top wall and a first side wall, the first top wall is connected to one end of the first side wall, the first top wall extend in a direction away from the sliding hole, the first top wall and the first side wall cooperatively define the mounting slot therebetween, the electromagnetic housing comprises a second side wall and a second bottom wall, the second bottom wall is connected to one end of the second side wall, the annular convex plate is protruded form an inner end of the second bottom wall, the first top wall and the second bottom wall are closed opposite ends of the mounting slot, and the first side wall and the second side wall are closed sides of the mounting slot, the second bottom wall is below the first side wall, and the annular convex plate is spaced from the second side wall to define the positioning groove therebetween.

17. The 3D printer of claim 12, wherein the mounting member comprises a first top wall and a first side wall, the first top wall is connected to one end of the first side wall, the first top wall extend in a direction away from the sliding hole, the first top wall and the first side wall cooperatively define the mounting slot therebetween, the electromagnetic housing comprises a second side wall and a second bottom wall, the second bottom wall is connected to one end of the second side wall, the annular convex plate is protruded form an inner end of the second bottom wall, the first top wall and the second bottom wall are closed opposite ends of the mounting slot, and the first side wall and the second side wall are closed sides of the mounting slot, the second bottom wall is below the first side wall, and the annular convex plate is spaced from the second side wall to define the positioning groove therebetween.

* * * * *